United States Patent [19]

Mayes

[11] 4,174,271

[45] Nov. 13, 1979

[54] HIGH SEVERITY REFORMING

[75] Inventor: Warden W. Mayes, Big Spring, Tex.

[73] Assignee: Cosden Technology, Inc., Big Spring, Tex.

[21] Appl. No.: 848,229

[22] Filed: Nov. 3, 1977

[51] Int. Cl.$^2$ .............................................. C10G 35/08
[52] U.S. Cl. ........................................ 208/64; 208/65; 208/138; 208/139
[58] Field of Search ..................... 208/62, 63, 64, 139, 208/66, 138

[56] References Cited

U.S. PATENT DOCUMENTS

| | | | |
|---|---|---|---|
| 2,848,377 | 8/1958 | Webb | 208/139 |
| 2,908,629 | 10/1959 | Thomas | 208/66 |
| 3,499,945 | 3/1970 | Kirk | 260/674 R |
| 3,635,815 | 1/1972 | Kuchar | 208/95 |
| 3,647,679 | 3/1972 | Kirk et al. | 208/64 |
| 3,871,996 | 3/1975 | Sinfelt | 208/139 |
| 4,000,058 | 12/1976 | Duhaut | 208/139 |

OTHER PUBLICATIONS

Knight et al., Modern Petroleum Technology, J. Wiley & Sons, New York, (1973), p. 335.

*Primary Examiner*—C. Davis
*Attorney, Agent, or Firm*—Schwartz, Jeffery, Schwaab, Mack, Blumenthal & Koch

[57] ABSTRACT

Disclosed is a process for the production of highly aromatic reformates in high yield from a naphtha feed fraction by high-severity catalytic reforming using a reforming catalyst which includes a hydrocracking promotor metal. The process comprises reforming the stock under conditions of high severity in a plurality of sequentially arranged reaction zones in which the concentration of the hydrocracking promotor metal of the reforming catalyst is adjusted to provide a minimal hydrocracking activity relative to the other reforming reactions to the catalyst in the first reaction zones, and an enhanced hydrocracking activity to the catalyst in the last reaction zones. The reformates produced according to this process are particularly useful in the blending of high aromatic content gasoline and/or in the production of high purity aromatic hydrocarbons.

30 Claims, 1 Drawing Figure

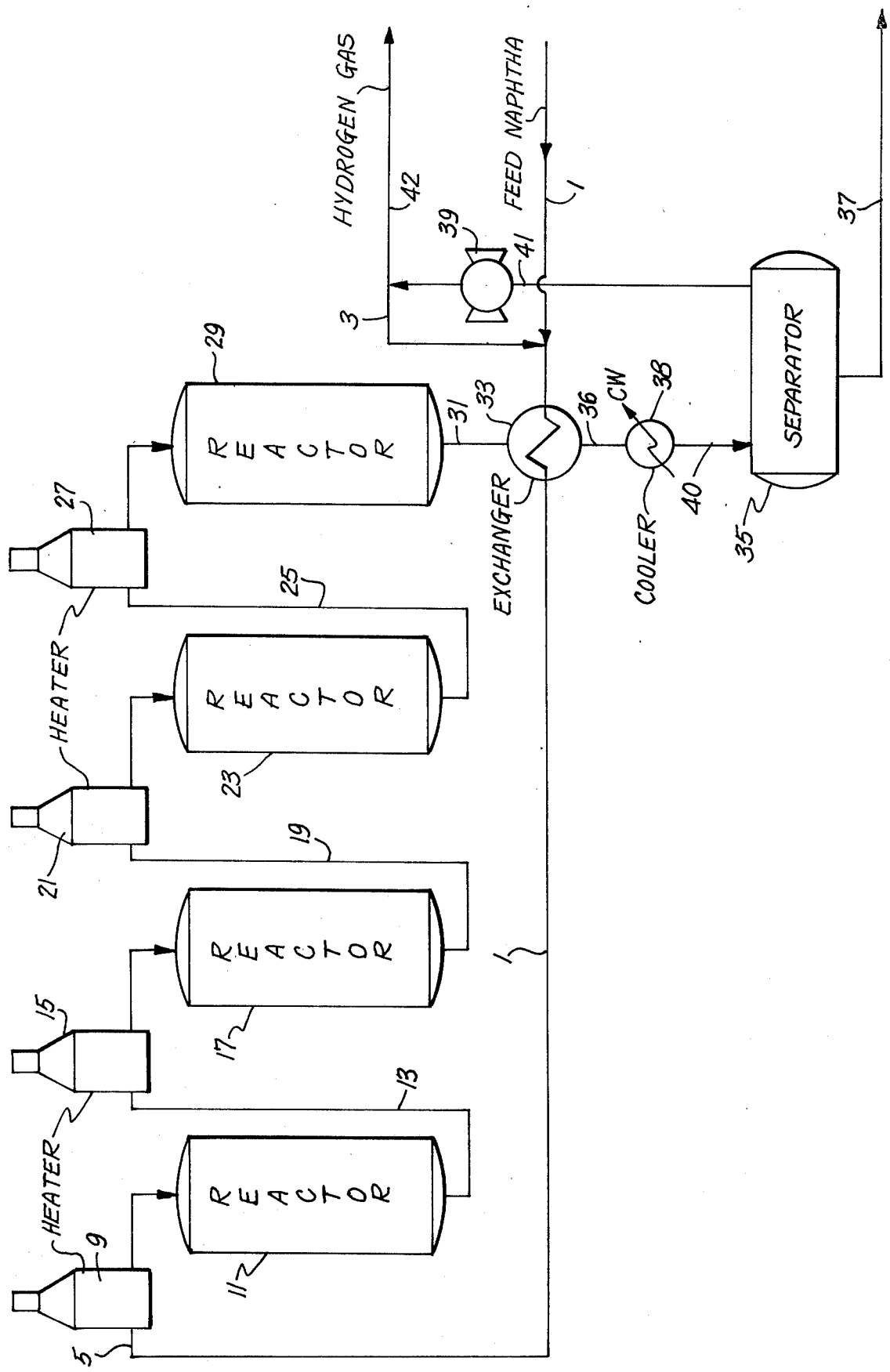

HIGH SEVERITY REFORMING

BACKGROUND OF THE INVENTION

The present invention relates to the high-severity reforming of hydrocarbon stocks to produce highly aromatic reformates which are suitable for use in blending high aromatic content motor gasolines and/or for the production of high purity aromatic petrochemical products. More particularly, the present invention relates to a process for the high-severity reforming of naphtha stocks, using a reforming catalyst which includes a hydrocracking promotor metal to produce aromatic hydrocarbons, and especially to produce aromtic hydrocarbons in heretofore unobtainable yields and with a minimum concentration of non-aromtic mterial present therewith under conditions in which the balance between the vrious reforming reactions is controlled by catalyst modifiction to favor production of aromtic hydrocarbons.

The process of the present invention is particularly efficacious for the production of $C_6$ to $C_8$ aromatic hydrocarbons with outstanding purity and yield. As will be understood by those skilled in the art, the term "$C_6$ to $C_8$ aromatic hydrocarbons" as used herein refers to aromatic hydrocarbons having 6 to 8 carbon atoms per molecule, and includes such aromatic hydrocarbons as benzene, toluene, and xylene. As also used herein, the term "xylenes" refers to the $C_8$ aromatic hydrocarbons in a generic sense and includes para-xylenes, meta-xylenes, ortho-xylenes, and ethylbenzenes. Alternatively, while the process of the instant invention is particularly suitable for the production of aromatic hydrocarbons in high purity, it may also be utilized with advantage in the production of highly aromatic gasolines, as will become apparent to those skilled in the art.

Moreover, as further used herein, the term "highly aromatic reformates" refers to those reformates which are of sufficient quality to yield $C_7$ and/or $C_8$ aromatic hydrocarbons of commercially acceptable quality directly upon fractional distillation without the necessity for solvent extraction or extractive distillation. Generally such reformates will have a research clear octane value of at least about 100. Accordingly, the present invention contemplates the production of reformates of at least about 100 research clear octane. Reformates of this octane value are highly useful in the production of high purity aromatic hydrocarbons, and are also highly advantgeous for use as blending stocks in the preparation of high octane, lead-free motor gasolines having a high aromatic content.

In the production of aromatic hydrocarbons, it is well known that naphthas contain large amounts of naphthenes and paraffins which can be catalytically reformed to aromatic hydrocarbons, and particularly $C_7$ and/or $C_8$ aromatic hydrocarbons under conditions effective for dehydrogenation, isomerization, and dehydrocylicization. It is also well known that platinum group metal based reforming catalysts which include a hydrocracking promotor metal are highly efficacious reforming catalysts. See, for example, U.S. Pat. Nos. 2,848,377 and 4,000,058.

Heretofore, the presence of higher boiling $C_8$ and $C_9$ non-aromatic compounds, particularly the $C_8$ paraffins, in the naphtha feedstock has posed significant obstacles to the production of high purity mixed xylenes in high yields. Likewise, the presence of the higher boiling $C_7$ and $C_8$ non-aromatics, particularly the $C_7$ paraffins, in the feedstock has posed an obstacle to the production of high purity toluene in high yield. In conventional reforming processes, significant quantities of these non-aromatic materials are not converted to aromatics and/or cracked to lower-boiling easily removable compounds. Consequently, reformates produced under conventional reforming conditions contain significant amounts of non-aromatics which cannot be separated from the aromatic material by low-cost separation techniques, such as fractional distillation, but only with great cost and difficulty, such as by solvent extraction or extractive distillation. Accordingly, in order to produce a $C_7$ and/or $C_8$ aromatic hydrocarbon product of commercial quality, it is conventional to subject the resultant reformate to a costly solvent extraction or extractive distillation step. Due to the large cost attendant to solvent extraction or extractive distillation, and the additional manpower required therefor, the prior art has sought to develop reforming processes which produce reformates which do not require expensive purification procedures in order to produce an aromatic hydrocarbon product of commercially acceptable quality.

Generally, these prior art processes have involved reforming the naphtha stocks under reforming conditions of high severity in order to crack the paraffins to easily removable gaseous hydrocarbons. In conventional high-severity reforming processes, however, the high severities necessary to produce a reformate having a concentration of unconverted non-aromatics sufficiently low to yield high-purity aromatic hydrocarbons without solvent extraction has also resulted in the cracking of significant quantities of aromatic precursors, with a concomitant decrease in yield of the aromatic product. Hitherto, therefore, conventional high severity reforming processes have been unable to realize the $C_7$ and/or $C_8$ aromatic hydrocarbons in satisfactory yields.

One approach to this problem has been to prefractionate the naphtha feedstock into very narrow boiling range naphtha heartcuts in order to exclude the higher boiling non-aromatics, which when reformed would result constituents which contaminate the aromatic hydrocarbon product and which can be removed therefrom only by solvent extraction or other expensive purification. By employing such prefractionations, the amount of difficulty convertible non-aromatic material is reduced, and consequently the reforming process can be operated under less severe reforming conditions, thereby reducing the volume loss resulting from high severity reforming. For example, in U.S. Pat. No. 3,635,815, a naphtha feed fraction is prefractionated into an overhead fraction having an upper endpoint of 270° F. to 275° F. and a bottoms fraction having a higher endpoint. The overhead fraction is then catalytically reformed under reforming conditions of severity sufficient to convert any remaining non-aromatic material to easily removable compounds. The resulting reformate is then subjected to a plurality of fractionation steps to produce a mixture of high-purity $C_8$ aromatic hydrocarbons.

Similarly, in U.S. Pat. No. 3,499,945, a petroleum naphtha fraction is prefractionated to produce a $C_7$ naphthene containing heartcut having a distillation endpoint of 175° F. to 220° F. The $C_7$ naphthene and paraffins containing heartcut is reformed to convert toluene precursors, such as the $C_7$ naphthenes, to toluene, yielding a reformate which is fractionated to produce a bottoms fraction, boiling above 225° F., rich in toluene. Fractionation and thermocracking of the 225° F. endpoint bottoms fraction then yields a high-purity toluene product.

While the above processes product $C_7$ and/or $C_8$ aromatic hydrocarbons of adequate purity, these processes still achieve less than desirable yields. Prefractionation of the naphtha feedstocks into such very narrow boiling range fractions removes significant quantities of $C_6$ to $C_8$ romatic hydrocarbon precursors from the conversion process and correspondingly reduces the yield of $C_6$ to $C_8$ aromatic hydrocarbons per volume of naphtha feed.

It is also known in the art that the aromatic content of gasolines may be increased by first reforming a naphtha stock under conditions such as to minimize hydrocracking, and then cracking the resulting reformate to convert a large part of the paraffin content to low-boiling olefins. U.S. Pat. No. 2,908,629 describes one such process in which a straight-run naphtha is first reformed by contact with a dual-function dehydrogenation catalyst under conditions which minimize hydrocracking, and then cracked by contact with a conventional cracking catalyst to convert a large portion of the paraffin content to lower boiling non-aromatics. However, while this process reduces naphthene cracking, it requires the operation of an additional process unit and the thermal cracking results in some reduction in potential aromatic hydrocarbons. Moreover, in the upgrading of gasolines, it is desirable to convert the heavy paraffinic material to high octane branched paraffins. The formation of reformates containing a high percentage of desirable isoparaffins is incompatible with the production of reformates suitable for the preparation of high-purity aromatic hydrocarbons, and consequently would preclude the production of the aromatic compounds in pure form without extensive subsequent purification. Accordingly, this process is less satisfactory for the production of high-purity $C_6$ to $C_8$ aromatic hydrocarbons.

In view of the great demand for commercial purity $C_7$ and/or $C_8$ aromatic hydrocarbons, and in view of our ever declining supplies of petroleum, the low yields and/or aromatic content of reformates obtained with the prior art reforming processes renders their use undesirable. Accordingly, there exists a great need in the art for a process for the manufacture of highly aromatic reformates having a low concentration of difficultly separable non-aromatic compounds in high yield.

SUMMARY OF THE INVENTION

Accordingly, it is an object of the present invention to provide a high severity reforming process for the production of reformates of high aromatic concentration, having a minimum amount of difficulty separable non-aromatic material present therewith, with a heretofore unobtainable yield.

Still another object of the present inventiion is the provision of a high severity reforming process for the production of highly aromatic reformates, using a reforming catalyst which includes a hydrocracking promotor metal, which maximizes the yield of aromatic hydrocarbons obtainable from each volume of naphtha feed, and which reduces the nonaromatic content thereof to a minimum.

It is a particular object of the instant invention to provide a high-severity reforming process for the production of highly aromatic reformates suitable for use in the manufacture of high-purity $C_7$ and/or $C_8$ aromatic hydrocarbons of commercially acceptable quality.

An additional object of the instant invention is the provision of a high-severity reforming process for the production of reformates of high aromatic concentration suitable for use in the blending of high aromatic content motor gasolines.

Yet another object of the instant invention is to provide a process for the production of high-purity aromatic hydrocarbons, particularly $C_7$ and $C_8$ aromatic hydrocarbons, which eliminates the necessity for costly purification procedures such as solvent extraction or extractive distillation.

A specific object of the present invention is to provide a process for the production of high-purity mixed xylenes, and/or toluene, wherein a product of commercially acceptable purity can be produced without costly purification procedures, and wherein the yield of the aromatic hydrocarbons per volume of naphtha charge is maximized, by high severity reforming.

In accomplishing the foregoing and other objects, there has been provided in accordance with the present invention a high-yield process for reforming naphtha charge stocks under reforming conditions of high severity, utilizing a reforming catalyst which includes a hydrocracking promotor metal which accrues a maximum yield of aromatic hydrocarbons, and which maximizes the conversion of nonaromatic compounds. This process comprises reforming the hydrocarbon charge stock in a plurality of sequentially arranged reaction zones in which the concentration of the hydrocracking promotor metal of the reforming catalyst is adjusted to provide a maximum hydrocracking activity to the catalyst in the last reaction zone or zones, and a minimal hydrocracking activity to the catalyst in the first reaction zone or zones. Applicant has found that by employing the instant reforming process, a reformate may be produced having a $C_6$ to $C_8$ aromatic hydrocarbon content heretofore unobtainable, and a minimum content of difficulty removable nonaromatic material.

The essence of the instant invention resides in applicant's discovery that increasing concentrations of certain promotor metals increase the reaction rate of hydrocracking relative to other reforming reaction rates. Applicant has found that this discovery may be exploited in the production of aromatic hydrocarbons by reforming hydrocarbon stocks in a multiple reaction stage reforming system in which the reforming conditions in the first reaction stage or stages are adjusted by catalyst modification to favor maximum conversion of the non-aromatic material to aromatic compounds, and in the last reaction stage or stages, to increase the reaction rate of hydrocracking, relative to the other reforming reaction rates. By employing the instant reforming process, the conversion reaction of the non-aromatic compounds to their corresponding aromatic hydrocarbons is allowed to go to substantial completion before the hydrocracking reaction is increased, thereby producing a maximum yield of aromatic hydrocarbons and a minimum loss to gaseous hydrocarbons. This result is unobtainable with conventional reforming processes, wherein catalyst modification is not employed, since even under milder reforming conditions, the reforming catalyst conventionally used therein produces a significant amount of aromatic precursor cracking. Accordingly, by adjusting the hydrocracking promotor metal of the reforming catalyst in the first reaction stages to favor the conversion reaction and to disfavor the cracking reaction, a heretofore unobtainable yield of aromatic hydrocarbons can be achieved. In the last reaction stages, then, the severity of the reforming conditions and the concentration of the hydrocracking promotor metal of the reforming catalyst is adjusted to increase the hydrocracking reaction rate sufficiently to produce a minimum concentration of nonaromatic material in the reformate.

Production of reformates having a maximum aromatic hydrocarbon content is thus realized by utilizing catalyst modification to tailor the various reforming reactions to preferentially convert the nonaromtics to aromatic hydrocarbons. Broadly, any material known to increase the reaction rate of hydrocracking is suitable for use as the hydrocracking component of the reforming catalyst utilized in the process of the instant invention. Advantageously the hydrocracking component comprises a promotor metal known to have a favorable effect on the hydrocracking reaction rate, and preferably comprises a promotor metal selected from the group consisting of iridium, scandium, yttrium, titanium, zirconium, hafnium, thorium, germanium, manganese, and combinations thereof, with iridium being most preferred.

The reformates produced according to the reforming process of the instant invention are ideally suited for use in the preparation of $C_6$ to $C_8$ aromatics, and particularly $C_7$ and $C_8$ aromatic hydrocarbons, with a yield and purity heretofore unobtainable. The high aromatic content and minimum concentration of difficulty separable nonaromatic material of these reformates enables high purity aromatic hydrocarbons, and particularly $C_7$ and $C_8$ aromatics. to be produced therefrom directly by fractional distillation, without the necessity of further expensive purification steps. Accordingly, in a further aspect, the present invention thus provides a highly efficacious method for the preparation of high purity, commercial quality aromatic hydrocarbons.

Moreover, it should be noted that, while the instant reforming process is particularly suited for production of high-purity aromatics, it is also advantageous for use in the preparation of high aromatic content gasolines. Due to the current need for high octane, lead-free motor gasolines, it is becoming increasingly necessary to produce a high aromatic content reformate blending stock. The reforming process of the instant invention is also ideally suited for this purpose, since the reformates produced thereby have a maximum aromatic concentration.

Through the use of the process according to the present invention, aromatic hydrocarbons, and particularly $C_7$ and $C_8$ aromatics, may be produced in a highly pure form without the necessity for solvent extraction or other expensive purification procedures. Moreover, by employing catalyst modification, hydrocarbon stocks may be reformed under reforming conditions of heretofore unobtainable severity without destruction of the aromatic hydrocarbon precursors, and consequently with a yield of $C_6$ to $C_8$ aromatic hydrocarbons from each volume of charge significantly increased in comparison to conventionally employed processes. Accordingly, the instant invention provides a particularly efficacious process for the production of highly aromatic reformates, wherein both the aromatic content and yield is optimized.

Yet other objects and advantages of the present invention will become apparent to the skilled artisan upon examination of the following detailed description of the present invention, taken in conjunction with the figure of drawing.

BRIEF DESCRIPTION OF THE DRAWING

The accompanying FIGURE of drawing is a schematic drawing of one embodiment of a reforming system operated in accordance with the instant invention.

DETAILED DESCRIPTION OF THE PREFERRED EMBODIMENTS

Applicant has found that highly aromatic reformates may be produced with yields superior to conventional processes, and with a quality sufficient to enable the production of high purity $C_7$ and/or $C_8$ aromtics, wihtout the necessity for costly solvent extraction, extractive distillation, or the use of very narrow boiling range heartcuts by adjusting the concentration of the hydrocracking promotor component of a reforming catalyst to achieve the selective hydrocracking of unconverted higher boiling nonaromatic material at a specified point in the reforming process. The basis of applicant's invention resides in his discovery that by progressively increasing the concentration of the hydrocracking component of the reforming catalyst the reaction rate of hydrocracking relative to other reforming reaction rates is increased and that by modulating this reaction rate relationship to preferentially favor the production of aromatics, an improved yield is realized for a high severity operation. Accordingly, in the present invention, this discovery is exploited to provide a reforming process suitable for the production of aromatic hydrocarbons and/or high aromatic gasoline. This process comprises reforming a hydrocarbon charge stock in a multiple reaction zone reforming system in which the concentration of the hydrocracking promotor of the reforming catalyst is adjusted to allow, in the first reaction zone or zones, the dehydrogenation, isomerization, and dehydrocyclicization reactions to go to substantial completion with a minimum of hydrocracking activity, and in the last reaction zone or zones to enhance the reaction rate of hydrocracking relative to other reforming reaction rates. Since in the process of the instant invention the hydrocracking promotor concentration in the first reaction zones is adjusted to minimize hydrocracking, substantially all of the aromatic precursors are converted to their corresponding aromatic with negligible amounts of precursor cracking and gas production. Moreover, since aromatics are highly refractory, and are relatively unaffected by increasing concentrations of the hydrocracking promotor and elevated temperatures, in the last reaction zone or zones, the promotor concentrations of the catalyst and temperature can be increased to produce a severity sufficient to yield a reformate having a minimum amount of nonaromatic material, without a detrimental effect on the aromatic content. Accordingly, the process of the instant invention enables the use of ultimately high severities to achieve a selective hydrocracking of unconverted nonaromatic material without significant effect on the aromatic yield.

Referring now to the drawing, a conventional reforming system is illustrated, utilizing the reforming process of the instant invention for the production of high-purity $C_7$ and/or $C_8$ aromatic hydrocarbons. The reforming system may be of any type well known to those skilled in the art. For example, the reforming system may be a cyclic system, a semi-cyclic system or a moving bed system. The only requirement to successful operation of the instant invention is that the particular reforming system chosen be capable of high severity operation and comprise a plurality of sequentially arranged reaction zones. Moreover, the reaction zones may be housed in individual reactor vessels, or may be housed in a single vessel, as would be obvious to those skilled in the art. The reforming system may also be either an isothermal or adiabatic system. Suitably, the reforming system comprises at least three adiabatic reaction zones, and preferably four. In FIG. 1, the reforming system is illustrated as comprising four reforming reactors 11, 17, 23 and 29. The particular reforming reactors utilized may be of any suitable construction and may be such as found in any typical refinery.

Disposed within the reforming reactors 11, 17, 23 and 29 is the reforming catalyst. Any reforming catalyst well known to those skilled in the art which includes a hydrocracking promotor is suitable for use in the instant invention. Broadly, the hydrocracking promotor may comprise any material known to increase the reaction rate of hydrocracking. In the preferred embodiment, the hydrocracking promotor comprises a promotor metal known to have a favorable effect on the hydrocracking reaction rate, and preferably comprises a promotor metal selected from the group consisting of iridium, scandium, yttrium, titanium, zirconium, hafnium, thorium, germanium, manganese and combinations thereof and compounds containing such metals, with iridium being most preferred. Typically, the reforming catalysts utilized in the instant invention will comprise a platinum group metal, one or more of the aforementioned promotor metals, and halogen on an inorganic refractory support, and will typically contain from 0.05 to 0.8% platinum, from 0.1 to 10% by weight halogen, and from 0.2 to 0.2 weight % promotor metal. The preparation of these types of catalysts is well known to those skilled in the art, and any suitable method may be employed. U.S. Pat. Nos. 2,848,377 and 4,000,058, herein incorporated by reference, describe two particularly efficacious methods for the preparation of a platinum-halogen-iridium based reforming catalyst.

As has been emphasized, in the instant invention, the promotor metal concentration is adjusted to provide a minimal balance of hydrocracking activity, relative to the other reforming forming reactions, to the reforming catalyst in the first reaction zone or zones, and to provide an enhanced cracking activity to the reforming catalyst in the last reforming zone or zones. In one embodiment, this may be achieved by progressively increasing the promotor metal concentration from the first reforming reactor 11 through the last reforming reactor 29. Alternatively, in a second embodiment, the promotor metal concentration is adjusted to provide a minimal hydrocracking activity in the reactors 11, 17, and 23, and is increased only in the last reactor 29. When the promotor metal concentration is progressively increased from reactor 11 through reactor 29, the promotor metal concentration is typically progressively increased from 0.02 weight percent in reactor 11 to 0.2 weight percent in reactor 29. Alternatively, when the promotor metal concentration is increased only in reactor 29, the promotor metal concentration in reactors 11, 17, and 23 typically comprises 0.02 weight percent promotor metal, and in reactor 29, 0.2 weight percent promotor metal.

The reforming reactors 11, 17, 23, and 29 may be cyclically operated, semi-cyclically operated, or even of the moving bed type. However, when a moving bed reforming reactor is utilized, those reforming reactors having reforming catalyst with different promotor metal concentrations would require a separate catalyst circulation system, in order to prevent commingling of the different promotor metal content catalyst during regeneration procedures. Alternatively, the reforming system could be connected to a regeneration facility which has the capacity to regenerate each different promotor metal content catalyst independently.

The hydrocarbon charge stock desired to be reformed is introduced thorugh line 1 and is admixed with a recycled stream of hydrogen gas conducted through line 3. The hydrocarbon charge stock may be any suitable petroleum feed. For example, the hydrocarbon charge stock may comprise a full boiling range naphtha, naphtha fractions, or even a straight-run gasoline. Moreover, it is within the scope of the instant invention to pretreat the hydrocarbon charge stock to remove impurities such as sulfur compounds, nitrogen compounds, oxygen compounds, and heavy metals.

Conventionally, the naphtha feed may comprise a naphtha fraction, relatively free of normally gaseous hydrocarbons, boiling between about 90° F. and about 450° F., with a $C_6$–400° F. naphtha fraction being preferred. However, when it is desired to produce a reformate suitable for the production of high quality aromatic hydrocarbons, a particularly suitable naphtha feed comprises a $C_7$ and/or $C_8$ full boiling carbon number naphtha. As fully described in the aforementioned application, the term "full boiling carbon number naphtha fraction" refers to a naphtha fraction which has an ASTM distillation boiling range sufficient to include substantially all of the paraffins, naphthenes, and aromatic compounds having the same number of carbon atoms per molecule as the aromatics desired to be produced. Applicant has found that a naphtha feed with this boiling range contains essentially all of the naphthenes and paraffins of the proper number of carbon atoms per molecule which are convertible to $C_6$ to $C_8$ aromatic hydrocarbons, and minimizes the concentrations of paraffins and heavy naphthenes which can contaminate the $C_6$ to $C_8$ aromatic product. An especially useful full boiling carbon number naphtha fraction comprises a $C_6$ to $C_8$ naphtha fraction having an ASTM distillation endpoint of about 300° F. to about 360° F., and preferably of about 325° F., since the utilization of such a fraction enables the production of $C_7$ and $C_8$ aromatics with a particularly high purity, and a $C_6$ aromatic hydrocarbon concentrate.

After admixture with the hydrogen recycle stream, the combined naphtha feed and hydrogen stream is conducted through exchanger 33 and then through line 5 to heater 9 and the reformer reactor 11 wherein it is reformed under conditions maximizing aromatic precursor conversion. The partially converted feed stream is then withdrawn through line 13, passed through heater 15 and introduced into the reactor 17 where it is subjected to further reforming under conditions which further favor the conversion of non-aromatics to the corresponding aromatic hydrocarbons and which minimize hydrocracking. The further converted mixture of reactants and recycle hydrogen is then removed through line 19, passed through heater 21, and introduced into the last minimum cracking activity reactor 23 wherein the conversion of non-aromatic to aromatic achieves substantial completion, thereby enabling maximum production of aromatic hydrocarbons. The stream issuing therefrom consists essentially of aromatic hydrocarbons with a minor portion of unconverted non-aromatics. This stream is then transported via line 25 through heater 27, and introduced into the high severity reactor 29 wherein the promotor metal concentration of the reforming catalyst and the temperature is adjusted to provide an enhanced hydrocracking activity. Since the aromatics are highly stable compounds and are virtually unaffected by increasing concentrations of promotor metal and elevated temperatures, the remaining unconverted non-aromatic compounds are preferentially cracked to lower boiling easily removable hydrocarbons, yielding a reformate and hydrogen through line 31 containing a maximum aromatic content and a minimum of difficultly separable non-aromatic material.

By employing a multiple reaction zone reforming system wherein the reforming catalyst is modified to diminish hydrocracking activity in one phase of the reforming process and to enhance hydrocracking activity in another phase of the reforming process, the reforming conditions can be tailored to maximize the formation of $C_6$ to $C_8$ aromatic hydrocarbons. Moreover, the use of at least 3 and preferably 4 reaction stages enables the reforming conditions to be adjusted incrementally so as to provide reforming conditions optimum for each stage of the reforming reaction, thereby further maximizing the amount of $C_6$ to $C_8$ aromatic obtainable from each volume of charge. Accordingly, since most of the aromatic hydrocarbon precursors are converted to the aromatic before the hydrocracking reaction is enhanced, the reforming process may be operated in the last reaction stage or stages at heretofore unutilizable severities without unnecessary destruction of $C_6$ to $C_8$ aromatic hydrocarbon precursors. By operating at heretofore unutilizable severities, conversion of the unconverted non-aromatic material to components which are readily removed by distillation can be achieved to a far higher degree than heretofore possible. Consequently, a broad boiling range reformer charge, containing essentially all of the $C_6$ to $C_8$ aromatic precursors, may be utilized without an adverse effect on the purity of the resultant product, and without the necessity of a solvent extraction step, an extractive distillation step, or a prefractionation step to produce high-purity commercial quality aromatic hydrocarbons.

Generally, as has been emphasized, the reforming conditions are adjusted to provide maximum aromatic precursor conversion in the first reaction zones and a maximum hydrocracking activity in the last reaction zones and will preferably be of sufficient severity to produce a reformate having a research clear octane value of at least about 100. The severity of the reforming conditions may be measured by the temperature at which the reforming zone is maintained at a given space velocity. Typically, the reforming conditions include a temperature in the range of 800° F. to 1100° F. or more, and preferably in the range of 850° F. to 1000° F. and a pressure in the range of 50 psig to about 1000 psig or more, and preferably from 100 psig to 300 psig. The reforming process is also preferably maintained at a liquid hourly space velocity (1hsv) of 0.1 to 20 or more, and preferably in the range of from about 0.5 to 15.0 or more, and a recycle hydrogen rate of from about 1.0 to 20 or more moles of hydrogen per mole of naphtha feed. Applicant has found the optimum results are obtained in the process of the instant invention when a temperature in the range of 950° to 975° is maintained in the last reaction stage or stages, and a temperature of from 850° F. to 900° F. is maintained in the first reaction stages.

Alternatively, the severity of the reforming conditions may be measured by the $C_5+$ reformate target octane number, as described in U.S. Pat. No. 3,635,815, herein incorporated by reference, as will be obvious to those skilled in the art. In still another manner, the severity of the reforming conditions may be measured by the nonaromatic concentration within a defined boiling range fraction of the reformate product such as the toluene fraction. This is the preferred measure of severity due to the difficulty in measuring octane with reproducible results above 100 research clear octane.

After reforming, the resultant reformate is withdrawn through line 31, to exchanger 39, then through line 36 to cooler 38, and finally through line 40 to product separator 35. In the separator 35, the reformate product is separated into a liquid reformate product and a stream of recycle hydrogen gas. The recycle hydrogen is then withdrawn through line 41, and compressed in compressor 39 for return to the reforming system via line 3. Net hydrogen is withdrawn through line 42 for use in other refinery operations. The unstabilized reformate is withdrawn from separator 35 through line 37, and is transported to a system of fractionation columns wherein $C_7$ and/or $C_8$ aromatic hydrocarbons are obtained in highly pure form without the necessity of a solvent extraction step or other costly separation techniques, and a $C_6$ aromatic concentrate. Typically, the fractionation system will comprise a first fractionation column to separate the reformate into a low boiling overhead fraction and a $C_6+$ bottoms fraction, a second fractionation column for separating a $C_6$ to $C_8$ aaromatic hydrocarbon overhead fraction from any residual $C_9+$ hydrocarbons by fractional distillation, and subsequent fractional distillation columns for separating the $C_6$ to $C_8$ aromatic hydrocarbon fraction into high purity $C_7$ and $C_8$ aromatics, and a $C_6$ aromatic concentrate. The particular fractionation system employed may comprise any system capable of separating the reformate into the individual $C_6$ to $C_8$ aromatic compounds with a high efficiency.

Use of the instant invention thus provides a facile and economical method for the production of reformates of maximum aromatic hydrocarbon content with a heretofore unobtainable yield. Through the use of catalyst modification, the reforming reaction rates are regulated to provide a reformate containing a maximum aromatic hydrocarbon content and a minimum concentration of difficultly removable non-aromatic material. In contrast to conventional processes, the reformates produced by the process of the instant invention yield high-purity, commercial quality $C_7$ and/or $C_8$ aromatic hydrocarbons directly upon separation by fractional distillation. Accordingly, the instant invention provides a highly advantageous process for the production of high-purity $C_7$ and/or $C_8$ aromatic hydrocarbons.

While the instant invention is particularly suitable for the production of high-purity $C_7$ and/or $C_8$ aromatic hydrocarbons, it may also be employed, with minor modification, in the production of highly aromatic gasolines. Suitably, highly aromatic gasoline can be prepared according to the process of the instant invention by employing as the reformer charge fraction a straight-run gasoline, and then reforming under conditions which produce a reformate containing a maximum amount of aromatic material and a minimum of low-octane paraffins. The particular reforming conditions necessary to achieve such a product are well known in the gasoline upgrading art. Suitably, the reaction conditions disclosed in U.S. Pat. No. 2,908,629, herein incorporated by reference, may be employed.

While the invention has been described in terms of various preferred embodiments and illustrated by numerous examples, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the production of highly aromatic reformates, suitable for use as blending stocks in the blending of high aromatic content gasoline or the preparation of high purity aromatics, from a naphtha feed fraction by high severity catalytic reforming, using a reforming catalyst which includes a hydrocracking promotor metal, comprising reforming said naphtha feed under reforming conditions of high severity in a plurality of sequentially arranged reaction zones in which the concentration of the promotor metal of the reforming catalyst is adjusted to provide an enhanced hydrocracking activity to the catalyst in the last reaction zones, and a minimal hydrocracking activity to the catalyst in the first reaction zones.

2. The process of claim 1, wherein said promotor metal is selected from the group consisting of scandium, yttrium, titanium, zirconium, hafnium, thorium, germanium, manganese, iridium, combinations thereof and compounds containing said metals.

3. The process of claim 2, wherein said promotor metal is iridium.

4. The process of claim 1, wherein said stock is reformed in at least three reaction zones.

5. The process of claim 4 wherein said stock is reformed in four reaction zones.

6. The process of claim 1, when the concentration of the metal promotor of said catalyst is progressively increased from the first to the last of said reaction zones.

7. The process of claim 6, wherein the concentration of the metal promotor of said catalyst is increased progressively from about 0.02 to about 0.20 weight percent.

8. The process of claim 1, wherein the concentration of the metal promotor of said catalyst is maintained at a greater concentration in the last reaction zone than in the preceding reaction zones.

9. The process of claim 8, wherein the concentration of the metal promotor of said catalyst comprises about 0.20 weight percent in the last reaction zone and about 0.02 weight percent in the remaining reaction zones.

10. The process of claim 1, wherein said naphtha feedstock is a $C_6$ to 400° F. ASTM distillation endpoint naphtha fraction.

11. The process of claim 1, wherein said naphtha feedstock is a $C_6$ to $C_8$ naphtha fraction having an ASTM distillation endpoint of about 300° F. to about 360° F.

12. The process of claim 1, wherein said reforming conditions are of sufficient severity to produce a reformate having a minimum concentration of non-aromatic material, and/or a research clear octane value of about at least 100.

13. The process of claim 12, wherein said reforming conditions comprise a temperature of from about 800° F. to about 1100° F., a pressure of from about 50 psig to about 1000 psig, a liquid hourly space velocity of from about 0.1 to about 20.0 and a recycle hydrogen rate of from about 1.0 to 20 moles of hydrogen per mole of hydrocarbon feed.

14. The process of claim 13, wherein the temperature is maintained within the range of from about 950° to about 975° F. in the last reaction zones, and from about 850° F. to about 900° F. in the first reaction zones.

15. A process for the production of high-purity aromatic hydrocarbons selected from the group consisting of $C_7$, $C_8$, or $C_7$ and $C_8$ aromatic hydrocarbons in a high yield from a naphtha feed fraction by high-severity catalytic reforming, utilizing a reforming catalyst which includes a hydrocracking promotor metal, and fractional distillation, comprising the steps of:

a. reforming said naphtha feed under reforming conditions of high severity in a plurality of sequentially arranged reaction zones in which the concentration of the promotor metal of the reforming catalyst is adjusted to provide an enhanced hydrocracking activity to the catalyst in the last reaction zones, and a minimal hydrocracking activity to the catalyst in the first reaction zones; and b. fractionally distilling the resultant reformate to directly recover said aromatic hydrocarbons in highly pure form.

16. The process of claim 15, wherein said naphtha feed fraction is a C to C naphtha fraction having an ASTM distillation endpoint of 400° F.

17. The process of claim 15, wherein said naphtha feed fraction is a C to C naphtha fraction having an ASTM distillation endpoint of about 300° F. to 360° F.

18. The process of claim 15, wherein said aromatic hydrocarbons are selected from the group consisting of toluene, and mixed xylenes.

19. The process of claim 15, wherein said naphtha feed fraction is reformed in at least three reaction zones.

20. The process of claim 19, wherein said naphtha feed fraction is reformed in four reaction zones.

21. The process of claim 15, wherein the concentration of the promotor metal of said catalyst is progressively increased from the first to the last of said reaction zones.

22. The process of claim 21, wherein the concentration of the promotor metal of said catalyst is progressively increased from about 0.02 to about 0.20 weight percent.

23. The process of claim 15, wherein the concentration of the promotor metal of said catalyst is increased in the last reaction zone.

24. The process of claim 23, wherein the concentration of the promotor metal of said catalyst comprises about 0.20 weight percent in the last reaction zone and about 0.02 weight percent in the remaining reaction zones.

25. The process of claim 15, wherein said reforming conditions are of sufficient severity to produce a reformate having a minimum concentration of non-aromatic material, and/or a research clear octane value of at least about 100.

26. The process of claim 25, wherein said reforming conditions comprise a temperature of from about 800° F. to about 1100° F., a pressure of from about 50 psig to about 1000 psig, a liquid hourly space velocity of from about 0.1 to about 20.0 and a recycle hydrogen rate of from about 1.0 to 20 moles of hydrogen per mole of naphtha feed.

27. The process of claim 26, wherein said temperature is maintained within the range of from about 950 to about 975° F. in the last reaction zones, and from about 850° F., to about 900° F. in the first reaction zones.

28. The process of claim 15, wherein said promotor metal is selected from the group consisting of scandium, yttrium, titanium, zirconium, hafnium, thorium, germanium, manganese, iridium, combinations thereof and compounds containing said metals.

29. The process of claim 27, wherein said promotor metal comprises iridium.

30. A process for the production of highly aromatic reformates, suitable for use as blending stocks in the blending of high aromatic content gasoline or the preparation of high purity aromatics, from a naphtha feed fraction by high severity catalytic reforming, using a reforming catalyst which includes a hydrocracking promotor metal, comprising reforming said naphtha feed under reforming conditions of high severity in a plurality of sequentially arranged reaction zones in which the concentration of the promotor metal of the reforming catalyst is progressively increased from the first to the last of said reaction zones to provide an enhanced hydrocracking activity to the catalyst in the last reaction zones, and a minimal hydrocracking activity to the catalyst in the first reaction zones.

* * * * *